United States Patent
Bogert

(10) Patent No.: US 6,278,381 B1
(45) Date of Patent: Aug. 21, 2001

(54) FAULT CONDITION PROTECTIVE DEVICE FOR AIRCRAFT FUEL GAUGING SYSTEM

(75) Inventor: Charles E. Bogert, West Chester, PA (US)

(73) Assignee: Smiths Aerospace, Inc., Malvern, PA (US)

( * ) Notice: Subject to any disclaimer, the term of this patent is extended or adjusted under 35 U.S.C. 154(b) by 0 days.

(21) Appl. No.: 09/700,612
(22) PCT Filed: May 21, 1999
(86) PCT No.: PCT/US99/11343
§ 371 Date: Nov. 17, 2000
§ 102(e) Date: Nov. 17, 2000
(87) PCT Pub. No.: WO99/60539
PCT Pub. Date: Nov. 25, 1999

Related U.S. Application Data
(60) Provisional application No. 60/086,556, filed on May 21, 1998.

(51) Int. Cl.$^7$ .................................................. G08B 21/00
(52) U.S. Cl. ...................... 340/945; 340/618; 340/620; 307/326; 702/47; 702/52; 702/53; 361/43; 361/56; 361/57; 361/58; 361/284; 73/290 C; 73/304 C
(58) Field of Search ........................... 340/945, 618, 340/620; 307/326, 100; 702/52, 47, 53; 361/284, 43, 56, 58, 57, 111, 62; 73/304 C, 290 C, 149

(56) References Cited
U.S. PATENT DOCUMENTS

| | | | |
|---|---|---|---|
| 4,090,408 | 5/1978 | Hedrick | 73/304 C |
| 4,173,893 | 11/1979 | Hedrick | 73/304 C |
| 4,420,976 | 12/1983 | Orloff et al. | 73/304 C |
| 4,451,894 | 5/1984 | Dougherty et al. | 702/52 |
| 4,487,066 | 12/1984 | Pardi et al. | 73/304 C |
| 4,545,020 | 10/1985 | Brasfield | 702/52 |
| 4,589,077 | 5/1986 | Pope | 702/52 |
| 4,731,730 | 3/1988 | Hedrick et al. | 702/47 |
| 4,872,120 | 10/1989 | Orloff et al. | 702/52 |
| 4,908,783 | 3/1990 | Maier | 702/52 |
| 4,918,619 | 4/1990 | Orloff et al. | 702/52 |
| 5,121,631 | 6/1992 | Koon | 73/290 R |
| 5,128,593 | 7/1992 | Gilbert | 315/287 |
| 5,142,909 | * 9/1992 | Baughman | 73/304 C |
| 5,222,010 | 6/1993 | Capan | 361/56 |
| 5,602,333 | 2/1997 | Larrabee et al. | 73/149 |
| 5,613,399 | * 3/1997 | Hannan et al. | 73/304 C |
| 5,712,754 | 1/1998 | Sides et al. | 361/58 |
| 5,745,327 | 4/1998 | Choo | 361/111 |
| 5,751,534 | 5/1998 | DeBalko | 361/119 |
| 5,781,386 | 7/1998 | Muelleman | 361/43 |
| 5,786,972 | 7/1998 | Galipeau et al. | 361/56 |
| 5,793,197 | 8/1998 | Shirai et al. | 324/160 |

\* cited by examiner

Primary Examiner—Benjamin C. Lee
(74) Attorney, Agent, or Firm—Howson and Howson

(57) ABSTRACT

A fault protective device (48) for limiting the maximum current and voltage applicable to electronic components and wiring (26, 30) located in the fuel tank (10) of an aircraft. Particularly, a fuel gauging system circuit (18) extends from a generator (20) located outside the tank to at least one probe (14) located in the tank and from the probe to instrumentation (24) outside the tank. The device is electrically coupled to the circuit at the tank wall (28) and includes a voltage clamp (50) and series inductor-capacitor resonant circuit (46), so that the resonant circuit provides a low series impedance when applied with a signal at the operating frequency of the input signal applied by the generator but provides a high series impedance when experiencing a signal of a different frequency indicative of a system fault.

18 Claims, 4 Drawing Sheets

FAULT CONDITION PROTECTIVE DEVICE FOR AIRCRAFT FUEL GAUGING SYSTEM

This application claims the benefit of U.S. Provisional application No. 60/086,556, filed May 21, 1998.

FIELD OF THE INVENTION

The present invention relates generally to electronic systems which extend through the fuel tank of an aircraft, such as, systems for measuring the level of fuel in the tank of the aircraft, and more particularly, the present invention relates to a device for limiting current in wiring and electronic components located inside an aircraft fuel tank.

BACKGROUND OF THE INVENTION

For safety and economic reasons, aircraft must have the capability of determining accurately the amount of fuel onboard. Thus, various fuel gauging systems and other sensing apparatus have been utilized to deliver information concerning the status of fuel carried by the aircraft to the pilot. In general, all these systems require portions of electronic circuits, such as, wiring, probes, sensors, etc., to extend inside the fuel tank.

Examples of known aircraft fuel gauging systems are disclosed in U.S. Pat. No. 5,602,333 issued to Larrabee et al.; U.S. Pat. No. 4,918,619 issued to Orloff et al., U.S. Pat. No. 4,908,783 issued to Maier; U.S. Pat. No. 4,872,120 issued to Orloff et al.; U.S. Pat. No. 4,731,730 issued to Hedrick et al.; U.S. Pat. No. 4,451,894 issued to Dougherty et al.; U.S. Pat. No. 4,487,066 issued to Pardi et al.; U.S. Pat. No. 4,173,893 issued to Hedrick; and U.S. Pat. No. 4,090,408 issued to Hedrick.

Permitting excessive current to flow in wiring or electronic components located inside a fuel tank creates a potentially dangerous situation. Thus, the amount of current permitted in electronics in fuel tanks must be limited during normal operations of the systems and during unwanted fault conditions.

One example of a typical fault condition is a ground fault which results in a decrease in circuit resistance which, in turn, causes an increase In current. Another possible fault condition can occur between wiring of various circuits which are bundled together at locations exterior of the fuel tank along a given length of cableway. Such faults can result in greater voltages being applied on circuits extending into the fuel tank which, in turn, causes an increase in current in the electronics in the fuel tank.

Various surge protectors, circuit breakers and other current limiting devices are known which can be used to limit current through a circuit or a portion thereof For example, in the case of an aircraft fuel gauging system, transient suppressors can be electrically connected on each line entering or leaving the fuel tank to limit the voltage level, and a series resistor can be included on each line to set the resulting maximum current. However, since stray capacitance exists within an aircraft fuel tank, the addition of the series resistor causes a phase shift of the signal carried by the circuit, thereby degrading the accuracy of the fuel gauging system during normal operation.

Therefore, although various current limiting devices are known in the art which may be satisfactory for their intended purposes, there is a need for a current limiting device particularly useful in limiting the current through electronics located in and extending through the fuel tank of an aircraft. The device should be capable of limiting current without degrading the accuracy of the fuel gauging system.

OBJECTS OF THE INVENTION

With the foregoing in mind, a primary object of the present invention is to provide an improved current limiting device useful for limiting the amount of current through wiring, probes, sensors and the like, which are located inside the fuel tank of an aircraft.

Another object of the present invention is to provide an accurate aircraft fuel gauging system having a current limiting device which does not degrade the accuracy of the measurements provided by the fuel gauging system.

A further object of the present invention is to provide a current limiting device which is readily retrofittable for use in connection with an existing fuel gauging system on an aircraft.

SUMMARY OF THE INVENTION

More specifically, the present invention provides a fault condition protective device for use with an aircraft fuel gauging system having at least one probe disposed in an aircraft fuel tank for at least partial immersion in the fuel. The fuel gauging system includes a generator for applying an input signal at a predetermined frequency to the probe and instrumentation for receiving an output signal from the probe and for determining the quantity of fuel in the fuel tank. Both the generator and the instrumentation for determining the quantity of fuel in the tank are located exterior of the fuel tank and are electrically coupled to the probe via wiring extending through a wall of the fuel tank.

The fault condition protective device is electrically coupled to the probe at a location adjacent the wall of the fuel tank and has a voltage clamp and resonant circuit. The voltage clamp includes a resistor and a transient suppressor which limit the voltage applied to the probe. The resonant circuit includes an inductor and a capacitor which are connected in series and which resonate at a frequency substantially equal to the predetermined frequency of the input signal. The resonant circuit provides a low series impedance to the probe when the input signal frequency is substantially equal to the predetermined frequency and a high series impedance when the input signal frequency is not equal to the predetermined frequency as might be experienced during fault conditions.

BRIEF DESCRIPTION OF THE DRAWINGS

The foregoing and other objects, features and advantages of the present invention should become apparent from the following description when taken in conjunction with the accompanying drawings, in which.

DETAILED DESCRIPTION OF THE PREFERRED EMBODIMENT

Figure 1:
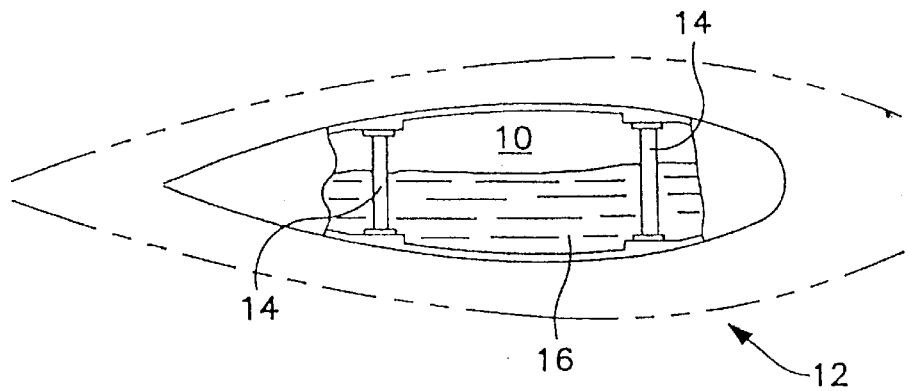
FIG. 1 is a schematic cross sectional view in reduced scale of a fuel tank located in the wing of an aircraft and having two fuel probes.

FIG. 1 illustrates schematically a portion of a fuel tank 10 located in the wing 12 of a typical aircraft. A series of probes 14, two in number in the illustration, extend transverse to the normal direction of fuel level movement, or vertically, within the fuel tank 10 in fore and aft relation. An electronic signal is applied to the probes 14 for producing an output signal which is a function of the level of fuel 16 in the probe 14. The measured level of fuel 16 enables the amount of fuel carried in the tank to be calculated and displayed on instrumentation located in the cockpit of the aircraft.

Figure 2:
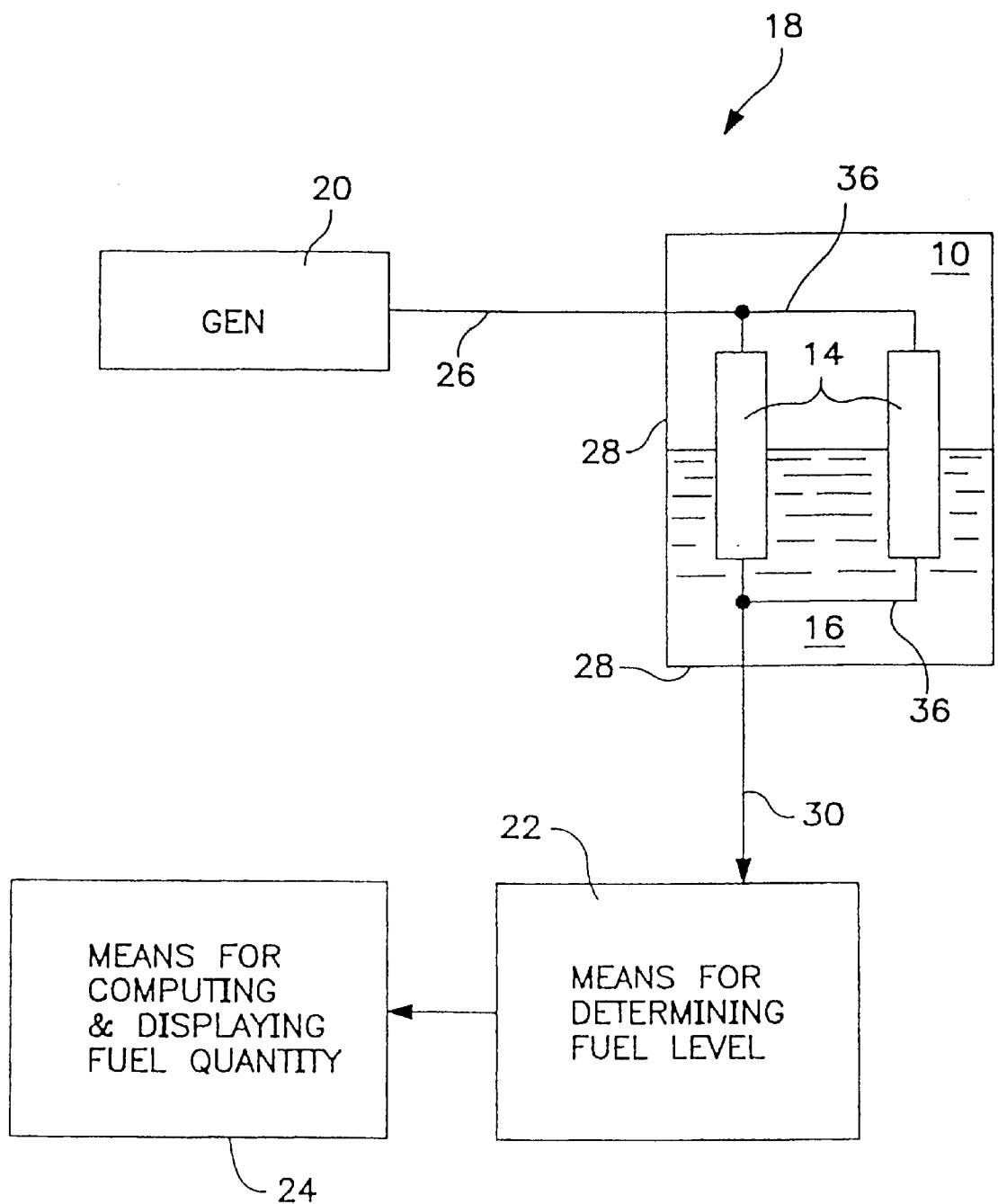
FIG. 2 is a simplified block diagram of an aircraft fuel gauging system.

The block diagram of FIG. 2 provides a simplified illustration of the operation of a typical fuel gauging system 18. A generator 20, located exterior of the fuel tank 10, applies an electric input signal at a predetermined frequency to several probes 14 located within the fuel tank 10. A means 22, also located exterior of the fuel tank 10, receives the response of the probes 14 to the input signal and determines the level of the fuel 16 within the fuel tank 10. A means 24 computes the quantity of fuel 16 in the tank 10 and displays the information to the pilot.

In the above described fuel gauging system, generator drive wiring 26 extends from the generator 20 to the fuel tank wall 28, and return wiring 30 extends from the tank wall 28 to the cockpit instrumentation. At least portions of the drive and return wiring, 26 and 30, extend in bundles in cableways located within the aircraft. The bundles include wiring from other systems (not shown) in the aircraft which typically are connected to, for instance, 28 VDC or 350 VRMS 400 Hz, power sources.

Figure 3:
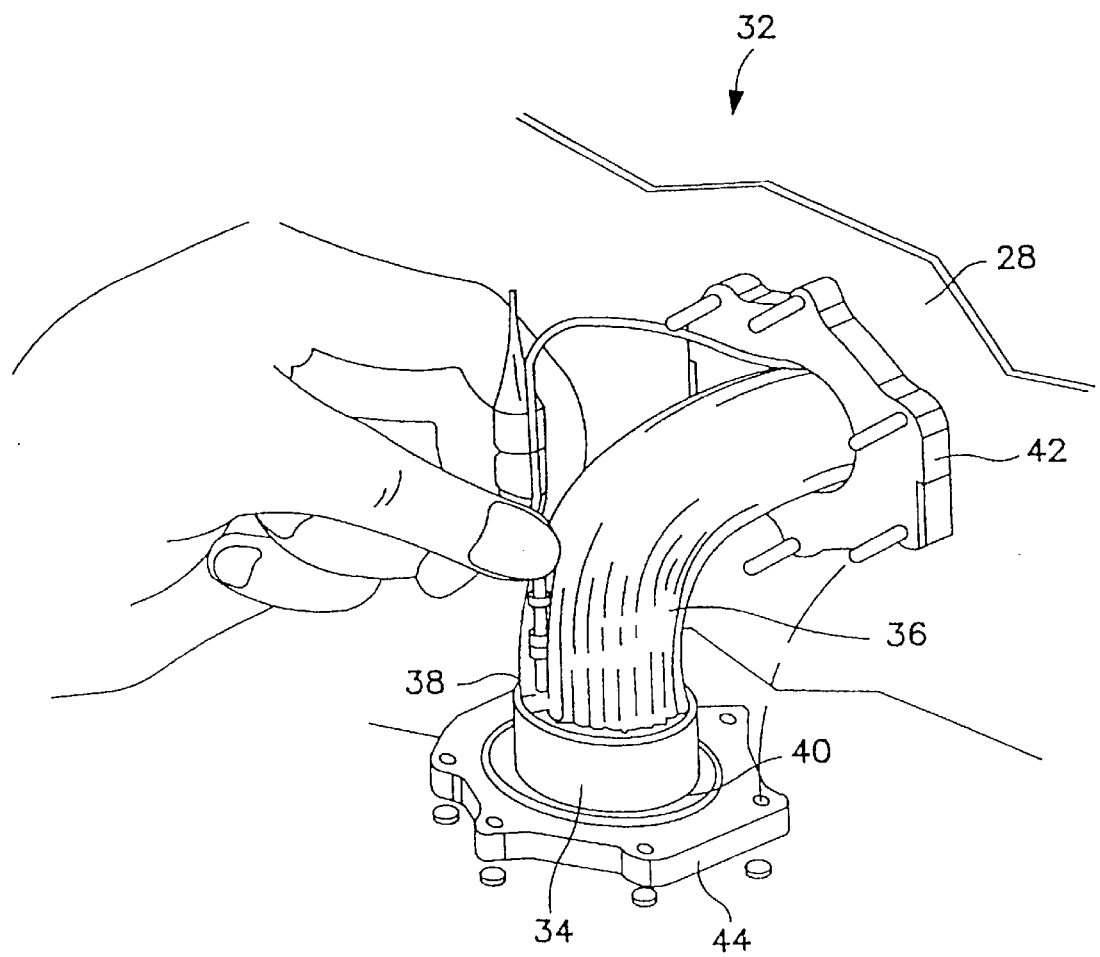
FIG. 3 is a perspective view of an unassembled prior art fuel tank wall connector plate showing various wiring entering/exiting a fuel tank through a wall of the fuel tank.
Figure 4:
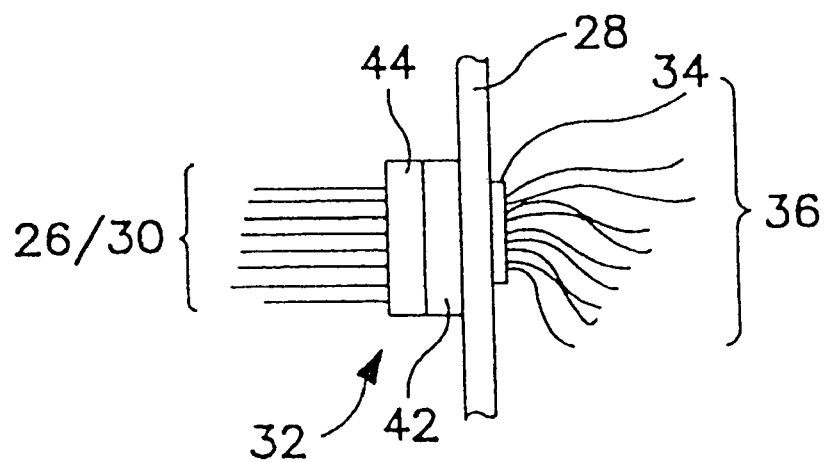
FIG. 4 is a cross sectional view of the fuel tank wall and assembled prior art connector plate.

As illustrated in FIGS. 3 and 4, wiring, 26 and 30, generally extend through the fuel tank wall 28 via a tank wall connector 32. The tank wall connector 32 includes a connection block 34 having opposite faces, 38 and 40, with, for instance, a plurality of female connectors. Male connectors on wiring 36 which extend to electronic components located inside the tank 10 are inserted into face 38 of the connection block 34, and corresponding male connectors of drive and/or return wiring, 26 and 30, which extend exteriorly of the fuel tank 10 are inserted into the opposite face 40 of the connection block 40. A pair of plates, 42 and 44, are utilized to hold the connection block 34 in place and to prevent unwanted disconnection. FIG. 4 illustrates the tank wall connector 32 fully assembled.

As previously discussed, various fault conditions can be experienced by the fuel gauging system which could increase the current flowing in the probes. A particularly dangerous fault condition occurs when the drive and/or return wiring, 26 and 30, of the fuel gauging system 18, located exterior of the fuel tank 10, forms an unwanted electrical connection with other aircraft systems operating at significantly higher voltages.

Figure 6:
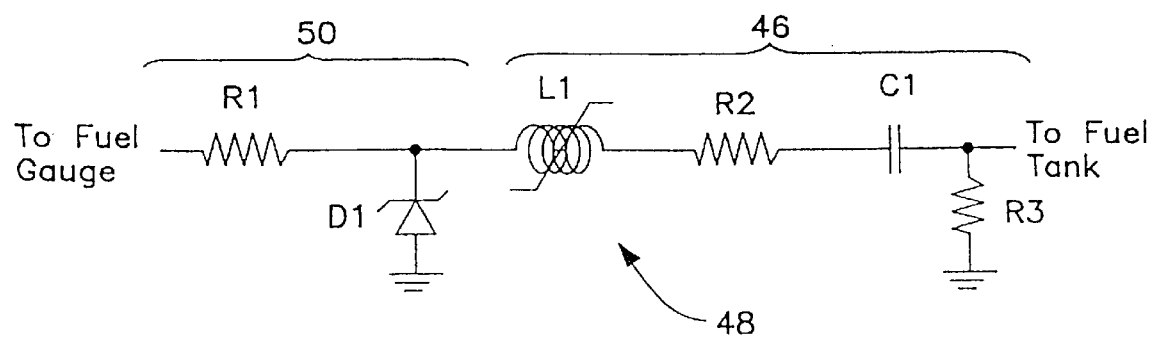
FIG. 6 is a circuit diagram of the current limiting device.

The present invention is capable of limiting the current which flows through electronics located within the fuel tank 10 during such a fault condition and accomplishes the same without degrading the accuracy of the fuel gauging system 18 during normal operation. To this end, the present invention utilizes a series inductor-capacitor resonant circuit 46 as illustrated in FIG. 6. The inductor and capacitor resonate at the input signal drive frequency so that the resonant circuit 46 provides a low series impedance to the fuel gauging system 18 during normal operation. This permits the fuel gauging, system 18 to provide accurate fuel level indication despite the presence of a current limiting device 48. However, during a fault condition, the series inductor-capacitor resonant circuit 46 provides a high series impedance which limits current.

Preferably, the fault condition protective, or current limiting, device 48 includes both a voltage clamp 50 and the resonant circuit 46. The voltage clamp 50 is provided by resistor R1 and transient suppressor D1 and limits the level of voltage applied to the electronics inside the fuel tank 10. The voltage clamp 50 is connected in series to the resonant circuit 46 which includes an inductor L1, resistor R2, capacitor C1 and resistor R3. The inductor L1, resistor R2 and capacitor C1 are connected in series. Resistor R3 provides a shunt path from the output of the current limiting circuit 46 to the grounded airframe. Preferably, the inductor L1 of the resonant circuit 46 is of a saturating design so that under fault conditions the resonant circuit 46 provides a high impedance after the current has exceeded the saturation threshold of the inductor L1, even if the applied signal is of the same frequency as the L-C resonating frequency. The RMS current permitted to flow in the electronics in the tank 10 is thereby limited.

Resistors R2 and R3 reduce the Q of the circuit which provides faster settling time and greater tolerance for the selected values of the inductor L1 and capacitor C1. The Q value is a measure of the sharpness of the resonance peak. The higher the Q, the sharper the peak. The Q must be set to allow proper operation of the fuel gauging system. If the Q is too high, the resonant circuit will be overly sensitive to component value drift with temperature and age, and will have a long settling time, which will interfere with proper gauge operation. If the Q is too low, the resonant L-C circuit will have a high apparent series resistance that will result in phase shifting of the signals and poor gauge operation.

Figure 5:
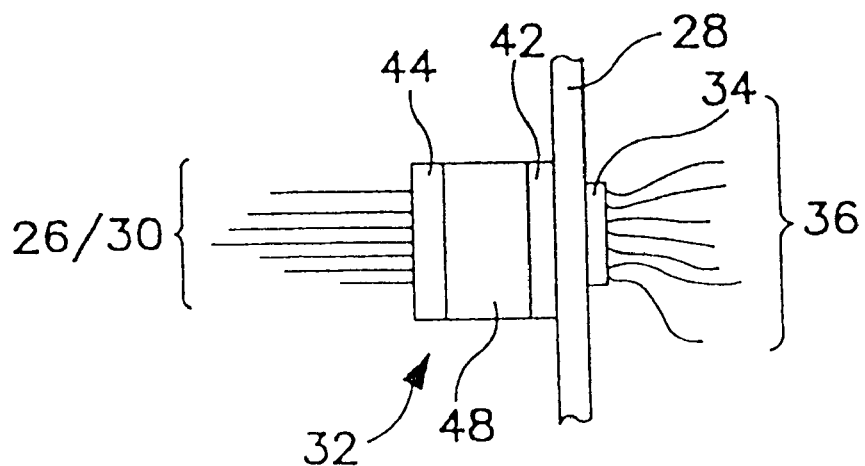
FIG. 5 is a cross sectional of the fuel tank wall and connector plate assembled with a current limiting device according to the present invention.

The current limiting device 48 of the present invention is preferably located at the tank wall 28 and is connected to the tank wall connector 32. As illustrated in FIG. 5, the device 48 is preferably capable of being plugged into the connection block 34, thus, it can readily be installed on existing fuel gauging systems of existing aircraft. The voltage clamp 50 and resonant circuit 46 is added to each line which extends into the tank 10. Preferably, the voltage clamp 50 is connected to the return wiring 30 and the resonant circuit 46 is connected to the wiring 36 extending within the fuel tank 10.

Figure 7:
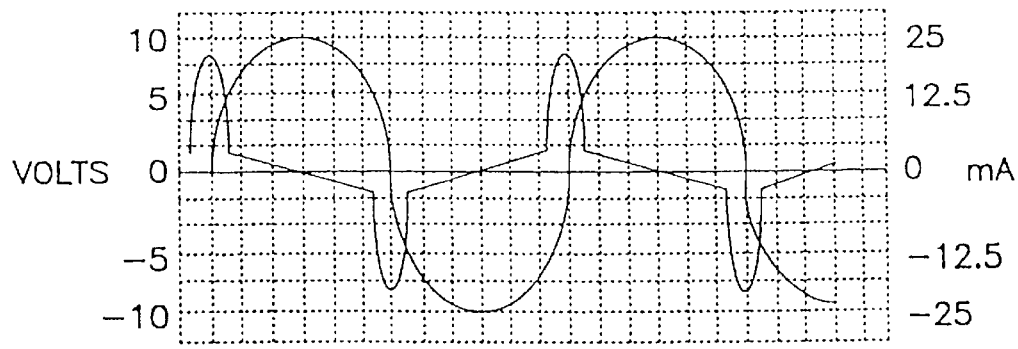
FIG. 7 is a graph of the waveforms of the applied voltage and resulting current of the current limited fuel gauging system.

By way of example and not by way of limitation, the current limiting device 48 is installed on a fuel gauging system 18 having a 10 volt peak amplitude sinusoidal input signal at 8 kHz. The values of the components were selected as follows: R2=5 ohms; C1=10,000 pfd; R3=12 k ohms; and L1=46 mH when not saturated and 0.5 mH when saturated. The saturation threshold is about 7 mA. As illustrated in FIG. 7, the resulting current waveform, if the output is connected to airframe, has an approximately 22 mA peak amplitude current and an approximately 8.2 mA RMS.

While a preferred current limiting device for an aircraft fuel gauging system has been described in detail, various modifications, alterations, and changes may be made without departing from the spirit and scope of the present invention as defined in the appended claims.

What is claimed is:

1. A fault condition protective device (48) for use with an electronic system (20) having at least one electronic component (14) located inside an aircraft fuel tank (10) and having wiring (26, 36) extending through a wall (28) of the aircraft fuel tank (10), the electronic system (20) applying an input signal at a predetermined frequency to the electronic component (14), comprising:

a resonant circuit (46) located adjacent the wall (28) of the aircraft fuel tank (10) and connected in series to the electronic component (20);

said resonant circuit (46) having a resonant frequency substantially equal to the predetermined frequency of the input signal, said resonant circuit (46) providing a low series impedance at said resonant frequency; and said resonant circuit (46) providing a high series impedance at signal frequencies corresponding to fault conditions to limit the current flowing in the electronic component (14).

2. A fault condition protective device (48) according to claim 1, wherein said resonant circuit (46) limits RMS current when a signal at the predetermined frequency is applied with a fault to airframe on a circuit output.

3. A fault condition protective device (48) according to claim 1, wherein said resonant circuit (46) has an inductor (L1) and capacitor (C1) connected in series.

4. A fault condition protective device (48) according to claim 3, wherein, when driven at said resonant frequency, said inductor (L1) saturates when current exceeds a predetermined threshold to limit the RMS current capable of flowing in the electronic component (14).

5. A fault condition protective device (48) according to claim 3, wherein said resonant circuit (46) has a shunt path to ground.

6. A fault condition protective device (48) according to claim 4, further comprising a voltage clamp (50) connected in series with said resonant circuit (46).

7. A fault condition protective device (48) according to claim 5, wherein said voltage clamp (50) includes a resistor (R1) and a transient suppressor (D1).

8. In an aircraft fuel gauging system (18) having at least one probe (14) disposed in an aircraft fuel tank (10) for at least partial immersion in the fuel, a generator (20) for applying an input signal at a predetermined frequency to the probe (14), the generator (20) being located exterior of the fuel tank (10) and being electrically coupled to the probe (14) via wiring (26, 36) extending through a wall (28) of the fuel tank (10), and instrumentation (24) for receiving an output signal from the probe (14) and for determining the quantity of fuel in the fuel tank (10), the instrumentation (24) being located exterior of the fuel tank (10) and being electrically coupled to the probe (14) via wiring (30, 36) extending through the wall (28) of the fuel tank (10), the improvement comprising:

a resonant circuit (46) located adjacent the wall (28) of the aircraft fuel tank (10) and electrically coupled to the probe (14);

said resonant circuit (46) having a resonant frequency substantially equal to the predetermined frequency of the input signal;

said resonant circuit (46) providing a low series impedance at said resonant frequency; and said resonant circuit (46) providing a high series impedance at signal frequencies corresponding to fault conditions so that current flowing in the probe (14) is limited.

9. A fault condition protective device (48) according to claim 8, wherein said resonant circuit (46) limits RMS current when a signal at the predetermined frequency is applied with a fault to airframe on a circuit output.

10. A fault condition protective device (48) according to claim 8, wherein said resonant circuit (48) has an inductor (L1), a resistor (R2) and a capacitor (C1) connected in series.

11. A fault condition protective device (48) according to claim 10, wherein said inductor (L1) saturates when the applied current exceeds a predetermined threshold.

12. A fault condition protective device (48) according to claim 11, wherein said resonant circuit (46) has a shunt path which includes a resistor (R3) and which extends to a grounded airframe.

13. A fault condition protective device (48) according to claim 12, further comprising a voltage clamp (50) connected to said resonant circuit (46) in series with said resonant circuit (46).

14. A fault condition protective device (48) according to claim 13, wherein said voltage clamp (50) includes a resistor (R1) and a transient suppressor (D1).

15. In an aircraft fuel gauging system (18) having at least one probe (14) disposed in an aircraft fuel tank (10) for at least partial immersion in the fuel, a generator (20) for applying an input signal at a predetermined frequency to the probe (14), the generator (20) being located exterior of the fuel tank (10) and being electrically coupled to the probe (14) via wiring (26, 36) extending through a wall (28) of the fuel tank (10) and instrumentation (24) for receiving an output signal from the probe (14) and for determining the quantity of fuel in the fuel tank (10), the instrumentation (24) being located exterior of the fuel tank (10) and being electrically coupled to the probe (14) via wiring (30, 36) extending through the wall (28) of the fuel tank (10), the improvement comprising:

a fault condition protective device (48) electrically coupled to the probe (14) at a location adjacent the wall (28) of the fuel tank (10), said device (48) having a voltage clamp (50) and resonant circuit (46);

said voltage clamp (50) having a resistor (R1) and transient suppressor (D1) adapted to limit the voltage applied to the probe (14);

said resonant circuit (46) including an inductor (L1) and a capacitor (C1) connected in series and resonating at a frequency substantially equal to the predetermined frequency of the input signal such that said resonant circuit (46) provides a low series impedance when the input signal frequency is the predetermined frequency and a high series impedance at signal frequencies corresponding to fault conditions to limit the current flowing in the probe (14).

16. A fault condition protective device (48) according to claim 15, wherein said resonant circuit (46) limits RMS current when a signal at the predetermined frequency is applied with a fault to airframe on a circuit output.

17. A fault condition protective device (48) according to claim 16, wherein said inductor (L1) saturates and limits RMS current in the event the input signal at the predetermined frequency is applied with a fault to around on a circuit output.

18. A fault condition protective device (48) according to claim 17, wherein said resonant circuit (46) has a shunt path to ground.

* * * * *